(12) United States Patent
Papenburg et al.

(10) Patent No.: US 6,389,801 B1
(45) Date of Patent: May 21, 2002

(54) JET PROPULSION POWER UNIT WITH NON-METAL COMPONENTS

(75) Inventors: Ulrich Papenburg, Lindach; Ernst Blenninger, Munich; Henning Herbig, Holzkirchen; Guenter Langel, Munich, all of (DE)

(73) Assignees: DaimlerChrysler AG, Stuttgart; IABG GmbH, Ottobrunn, both of (DE)

( * ) Notice: Subject to any disclaimer, the term of this patent is extended or adjusted under 35 U.S.C. 154(b) by 0 days.

(21) Appl. No.: 09/459,285

(22) Filed: Dec. 17, 1999

(30) Foreign Application Priority Data

Dec. 17, 1998 (DE) .......................................... 198 58 197

(51) Int. Cl.⁷ ................................................. F02K 9/00
(52) U.S. Cl. ............................. 60/257; 60/267; 60/271; 239/127.1
(58) Field of Search ........................... 60/267, 271, 257; 239/127.1

(56) References Cited

U.S. PATENT DOCUMENTS

| | | | | |
|---|---|---|---|---|
| 4,840,025 A | | 6/1989 | Coffinberry | |
| 5,352,312 A | * | 10/1994 | Guillot | 156/172 |
| 5,380,475 A | | 1/1995 | Goedtke et al. | |
| 5,899,060 A | * | 5/1999 | Schmidt | 60/167 |
| 6,151,887 A | * | 11/2000 | Haidn | 60/257 |
| 6,182,442 B1 | * | 2/2001 | Schmidt et al. | 60/267 |

* cited by examiner

*Primary Examiner*—Charles G. Freay
*Assistant Examiner*—Ehud Gartenberg
(74) *Attorney, Agent, or Firm*—W. F. Fasse; W. G. Fasse

(57) ABSTRACT

A rocket engine has a combustion chamber and an expansion chamber interconnected by a nozzle. Both chambers and the nozzle are made of carbon fiber reinforced silicon carbide formed as a monolithic rocket engine body or formed in sections bonded to each other to also form such a monolithic rocket engine body. The rocket engine body is mounted in a support structure, preferably made of a metal. The rocket engine body sections are produced by mechanical machining of respective blanks made of C/SiC materials. Cooling channels and/or heat insulation structures are used for heat control. The insulation structures are preferably also made of C/SiC materials or of carbon fiber felts or of graphite film.

18 Claims, 3 Drawing Sheets

PRIOR ART FIG.1

JET PROPULSION POWER UNIT WITH NON-METAL COMPONENTS

PRIORITY CLAIM

This application is based on and claims the priority under 35 U.S.C. §119 of German Patent Application 198 58 197.1, filed on Dec. 17, 1998 the entire disclosure of which is incorporated herein by reference.

FIELD OF THE INVENTION

The invention relates to a rocket engine with a central body enclosing a combustion chamber, a nozzle and an expansion chamber mounted in a support structure.

BACKGROUND INFORMATION

In a known rocket engine as shown in FIG. 1, a converging combustion chamber 1 and a nozzle 2 and a diverging expansion chamber 4 are positioned between a fuel injection head 3 and an expansion chamber extension 4'. The combustion chamber 1 and the nozzle 2 are the thermo-mechanically most heavily loaded components of such a rocket engine. The fuel injection head 3 injects fuels, for example hydrogen ($H_2$) and oxygen ($O_2$) or kerosene and nitric acid (MMH) and an oxidizer into the combustion chamber 1 for combustion. Combustion gases generated in the combustion chamber 1 converge into the nozzle 2 at very high temperatures and under very high pressures. Additionally, substantial pressure surges occur well above the normal operating conditions during certain operating ranges such as at ignition and when the engine is turned off. In addition, there is a high gas velocity in the expansion chamber 4 and its extension 4' diverging away from the nozzle 2. The combustion gases are expanded in the diverging section 4, 4' to the nozzle ultimate pressure of the engine.

A refractory high alloy steel with a high mechanical strength and a high temperature resistance must be used for constructing a conventional combustion chamber for a rocket engine due to the high temperatures and high pressures mentioned above. These high alloy steels, for example Inconel®, however still have the disadvantage of losing strength at temperatures of about 800° C. and higher in such a way that additional active cooling of the engine is necessary. This cooling is provided by appropriate cooling channels 6 cut or machined into the wall 5 that encloses the combustion chamber 1, the nozzle 2 and the expansion chamber 3. After machining, the cooling channels must be closed again at the channel surface by chemically applied material so that a coolant can flow through closed coolant channels. Such a formation of the cooling channels requires a difficult and cost intensive production.

OBJECTS OF THE INVENTION

In view of the foregoing it is the aim of the invention to achieve the following objects singly or in combination:

- to provide a power unit, more specifically a rocket engine body which encloses a converging combustion chamber, a nozzle and a diverging expansion chamber, preferably surrounded by an insulation, whereby such a body has a high temperature resistance, a high mechanical strength against pressure loads and a high abrasion resistance even at a low density, at a high heat conduction, and at a low thermal expansion;
- to substantially reduce the weight of rocket engines, particularly the weight of the above mentioned body that forms the converging combustion chamber, the nozzle proper, and the diverging expansion chamber;
- to use easily machinable or moldable materials for producing the critical rocket engine components to permit substantially unlimited geometric and shape variations; and
- to use materials that facilitate any machining operations as compared to high alloy steels which are difficult to machine.

SUMMARY OF THE INVENTION

According to the invention the rocket body that forms the combustion chamber, the nozzle, and the expansion chamber, and preferably also the insulation surrounding the body, are made of a ceramic material, namely carbon fiber reinforced silicon carbide composite material referred to herein as C/SiC. The C/SiC composite material body may be formed of a plurality of body sections which are ceramically or mechanically connected with each other. Alternatively, the body is formed as a monolithic structure. In the embodiment with a plurality of body sections these sections are bonded to each other by a silicon bonding layer which is siliconized to form a bonding seam or seams. The insulation, if used may also be provided in sections or may be part of the monolithic rocket engine structure.

According to a preferred embodiment of the invention the body forming the combustion chamber, the nozzle, the expansion chamber and the insulation surrounding the body, are made of the same C/SiC composite material to thus provide the monolithic structure, whereby the temperature stability of the engine is increased while simultaneously reducing the weight of the engine with its insulation compared to conventional engines of comparable size made of high alloy steel.

It was found that C/SiC has excellent strength characteristics up to very high temperatures which allow using this material under difficult operating conditions. Additionally, C/SiC offers a low density in combination with a high resistance to abrasion, a high resistance to oxidation, an excellent temperature stability even at temperature fluctuations, and a high thermal fatigue strength combined with an absolute gas and liquid impermeability. A great variety of geometric configurations are easily realized with C/SiC as used according to the invention because machining is easy compared to high alloy steels. The present rocket engine component has an excellent thermal strength and a high heat conductivity that is even adjustable by selecting the porosity of the C/SiC material. This characteristic of a high heat conductivity allows for correspondingly low cooling capacities. Certain engines according to the invention can completely do without cooling due to the high thermal strength and excellent heat conductivity.

A distinction is made between C/SiC reinforced by long, continuous length carbon fibers, and C/SiC reinforced by short-length carbon fibers or whiskers. The material with continuous length carbon fibers can be laminated, pressed, or rolled. The resulting components have a particularly high mechanical strength combined with a particularly low density. The oxidation resistance of C/SiC can be improved by providing a suitable surface sealing. Such a sealing is not required for components made of short-fiber reinforced C/SiC because the material is especially resistant against oxidation and corrosion. Furthermore, C/SiC offers an extremely good heat dissipation due to its good heat conduction. This excellent characteristic is combined with an especially high thermal shock resistance. Moreover, C/SiC is particularly suitable for mechanical machining of blanks in a green state, whereby the combustion chamber cross-section, the nozzle cross-section and the expansion chamber cross-section can be machined to any geometry or configuration, either out of a monolithic blank or out of individual blank sections which can be formed into a lining for the combustion chamber, the nozzle, and the expansion chamber.

If the rocket engine body is formed of several sections, the body sections and the insulation can be interconnected by a silicon layer interposed between these sections to form a siliconized bonding between the sections, whereby the desired monolithic structure is obtained. This bonding of sections to each other either of the body and/or of the insulation is especially suitable for short-carbon fiber reinforced C/SiC, because the internal surface areas of the sections surrounding the combustion chamber, the nozzle, and the expansion chamber, are more easily machined prior to bonding the sections to each other. The siliconization or silicon infiltration for the bonding can then follow as a separate operation. In both embodiments, the monolithic structure as well as the structure with bonded seams can be easily connected by flanges to the fuel injection head and to the extension of the expansion chamber. The flanges are preferably also made of C/SiC. Further, mechanical machining can be used to easily form cooling channels with round, rectangular, or slot-shaped cross-sections in the body and/or in the insulation portion or layer.

According to a further embodiment of the invention the inner wall of the rocket engine body surrounding the combustion chamber, the nozzle and the expansion chamber is lined with C/SiC sections which are bonded to each other by siliconizing to form a monolithic body. Such a monolithic body protects a support structure of the body and of any heat insulation. The support structure is preferably made of metal. The support structure in turn protects the rocket engine body against pressure overloads. The protection against heat overload may be further improved by cooling channels through which fuels such as hydrogen may flow as a coolant. An insulation layer preferably also made of C/SiC or out of carbon fiber felts or of a graphite film or combinations of these materials further reduces the heat and pressure load on the metallic support structure. The insulation materials can be connected to the C/SiC body by intermediate spacers between the insulation and the body. The spacers are preferably also made of C/SiC in order to form the desired monolithic structure. The spacers may form flow passages for a coolant between the insulation and the rocket engine body.

The density and porosity of C/SiC materials can be advantageously adjusted while the siliconization is taking place by controlling the quantity of silicon or silicon carbide added for the bonding of the material components by siliconization. For example, C/SiC with a high density and a low porosity may be used as a thermo-mechanical structure or as a lining for the above mentioned rocket engine body, while a C/SiC material with a low density and a high porosity can be used as the thermal insulation, preferably in the form of a layer or layers or coatings.

The above described insulation of the support structure against heat emanating from the C/SiC rocket engine body is achieved either by cooling channels or by the above mentioned thermal insulation layers that may be formed of C/SiC material and/or carbon fiber felts and/or graphite films. The insulation may be used alone or in combination with the cooling channels. This thermal protection minimizes the heat and pressure loads on the metallic support structure. As a result, a reduced deformation of the rocket engine body, especially in the nozzle cross-section area is assured. Due to the resulting smaller loads on the metallic support structure, the latter can be substantially simplified, which in turn means a simplified production because the previously necessary and expensive material application by chemical action for closing up the machined cooling channels are no longer necessary.

The rocket engine body made of C/SiC that surrounds the combustion chamber, the nozzle and the expansion chamber is supported by the above-mentioned support structure, preferably made of metal, for example in the form of a housing which transfers any static and dynamic in-flight loads to the fuselage. The housing provides or supports the mechanical connections, for example by flanges, to the fuel injection head and to the expansion chamber extension. In addition, the support structure connects the cooling system of the fuel injection head with the cooling system of the expansion chamber through any cooling channels in the support structure and/or in the insulation and/or in the rocket engine body.

Due to the gas and liquid impermeability of C/SiC materials, open cooling channels can be machined into the metallic support structure or into the insulation or into the rocket engine body of C/SiC material. These initially open cooling channels are closed up when the C/SiC body is inserted into the support structure without any other efforts to close the cooling channels along their open sides. Depending on the type of system or engine used, the inner profile of the combustion chamber is either made of C/SiC section blanks which are siliconized to form a monolithic structure as mentioned. However, it is also possible to produce the rocket engine body from a single piece blank. Machining the section blanks is performed prior to bonding the sections together. The C/SiC sections can themselves, if necessary, be provided with cooling channels in order to still more efficiently dissipate heat. Any insulation interposed between the radially outwardly facing surfaces of the body of C/SiC material and the support structure must be connected to the support and the rocket engine body. Suitable connecting elements are used to mount the body of C/SiC material in the support structure, for example by the above mentioned flanges of the rocket engine body whereby the body flanges are secured to further flanges of the support structure.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
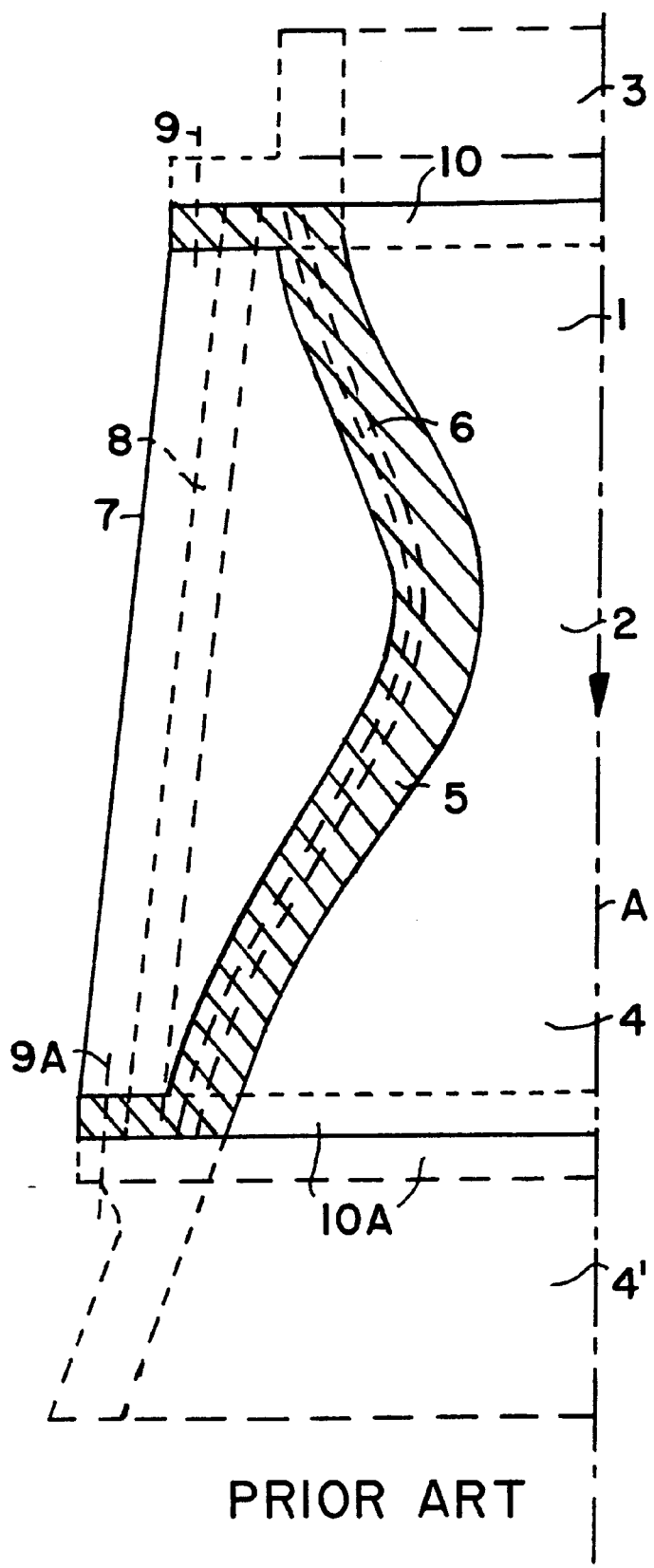
FIG. 1 shows schematically and partly in section one half of a conventional rocket engine made of high alloy steel, the half not shown is mirror-symmetrical relative to a central, longitudinal axis A.

FIG. 1 shows a conventional rocket engine component, the critical elements of which are made of high alloy steel such as Inconel®. A combustion chamber 1 is formed as a converging portion of the component. A nozzle 2 follows the combustion chamber 1 as viewed in a flow direction A. A diverging expansion chamber 4 follows the nozzle 2 downstream in the flow direction A which is also the central longitudinal axis of the rocket engine. A fuel injection head 3 leads into the combustion chamber 1. For example, screws 9 and flanges 10 interconnect the fuel injection head 3 to a housing or support structure 7 in which the engine component is mounted. Similarly, a combustion gas expansion chamber extension 4' is connected to the diverging expansion chamber 4 by screws 9A and by flanges 10A connected to the housing or support structure 7. Cooling channels 8 are part of the housing 7. The housing 7 forms a support structure for a wall 5 of Inconel® that surrounds the elements 1, 2 and 4. The wall 5 is also provided with cooling channels 6 for cooling the elements made of Inconel®.

Figure 2:
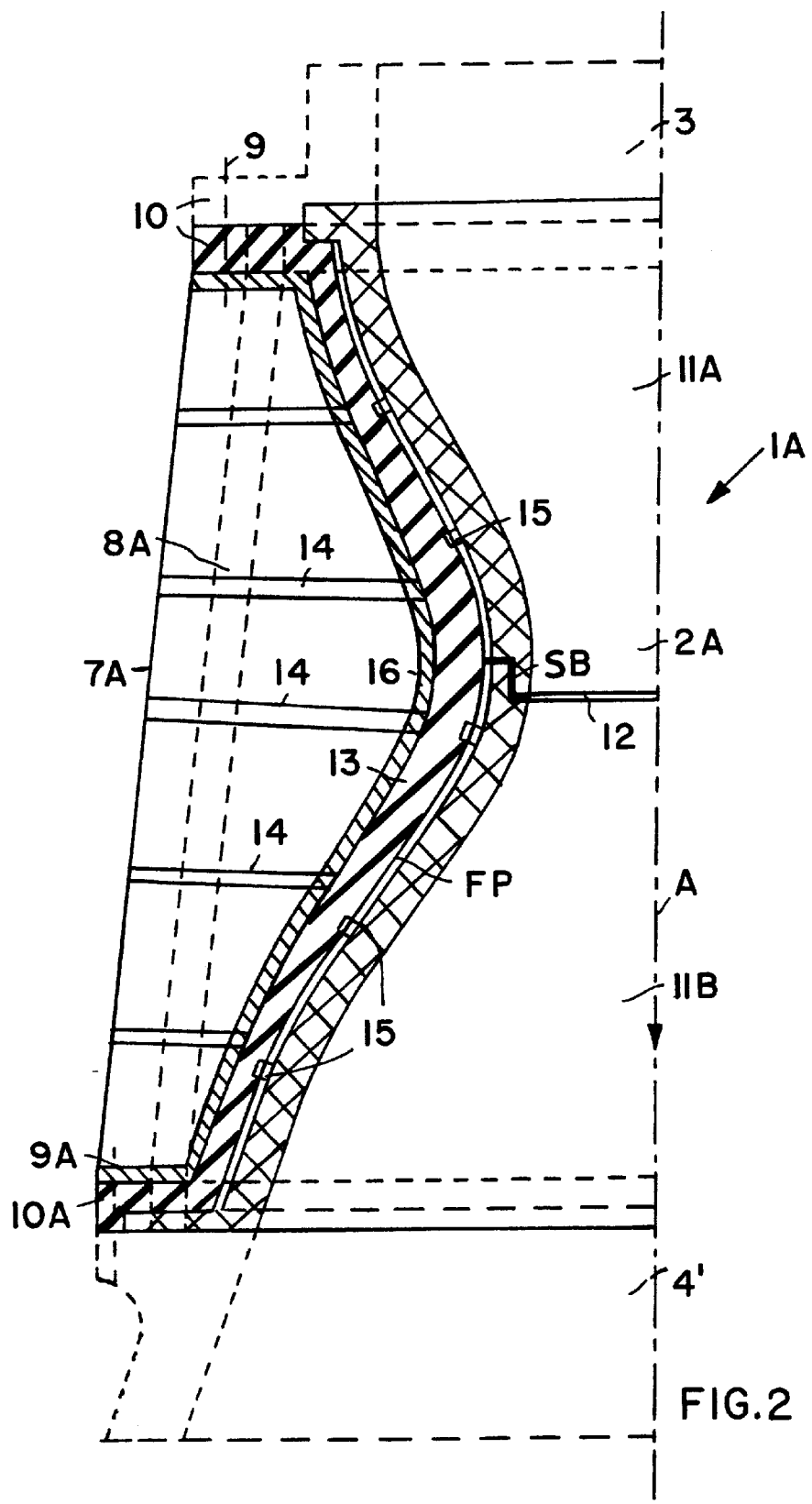
FIG. 2 shows schematically a view similar to that of FIG. 1, however illustrating a rocket engine body made of carbon fiber reinforced silicon carbide in two sections surrounding a combustion chamber, a nozzle, and an expansion chamber.

FIG. 2 shows schematically a first embodiment of a rocket engine body 1A made according to the invention of carbon fiber reinforced silicon carbide composite (C/SiC). The body 1A surrounds with its body sections a central longitudinal directional axis A. These sections include a combustion chamber 11A, followed by a nozzle 2A, followed in turn by an expansion chamber 11B. A single piece of C/SiC composite material forms the combustion chamber 11A and the nozzle 2A. A further single piece of C/SiC composite material forms the body section surrounding the expansion chamber 11B. These body sections are bonded to each other by a silicon layer 12 forming a siliconized bond SB. The bonding between the sections, must be formed in such a way that gases under high pressure and under high temperature operating conditions cannot permeate through the siliconized bond SB to a metallic support structure 7A having a cooling channel 8A. For this purpose the interface between the sections are formed with an axial end or radial overlap as shown at SB in FIG. 2. Such overlap also facilitates the centering of the sections relative to each other when they are assembled.

As further shown in FIG. 2, an insulation layer 13 surrounds the rocket engine body 1A radially outwardly thereof so that the insulation layer 13 is interposed between the body 1A and a support element such as a wall 16 of the metallic support structure 7A. The support element 16 may be held in place by ribs 14, for example. Structural details of the support structure 7A are not critical. Spacer elements 15 may be optionally inserted between the insulation layer 13 and the body 1A to form a cooling flow passage FP for a coolant. The so formed cooling flow passage FP and the cooling channel 8A are interconnected with a cooling system of the fuel injection head 3 and the gas expansion chamber extension 4' through the flanges 10 at one end and the flanges 10A at the other end of the rocket engine body 1A.

The insulation layer 13 and the spacer elements 15 are also preferably made of carbon fiber reinforced silicon carbide composite material. However, the insulation layer 13 may be made instead of materials selected from the group of graphite film, graphite felt and/or graphite fleece materials which may be reinforced by carbon fibers interposed between the body 1A and the support structure 7A.

The rocket engine body 1A of carbon fiber reinforced silicon carbide composite material has a first porosity and a first density while the insulation layer 13 has a second porosity and a second density differing from the first porosity and the first density, respectively. Preferably, the second porosity of the insulation layer 13 is higher than the first porosity of the body 1A and the second density of the insulation layer is lower than the first density of the body 1A.

The higher density and lower porosity of the wall of the body 1A is indicated by cross-hatching. The higher porosity and respective lower density of the insulation layer 13 is indicated by heavy hatching lines.

Figure 3:
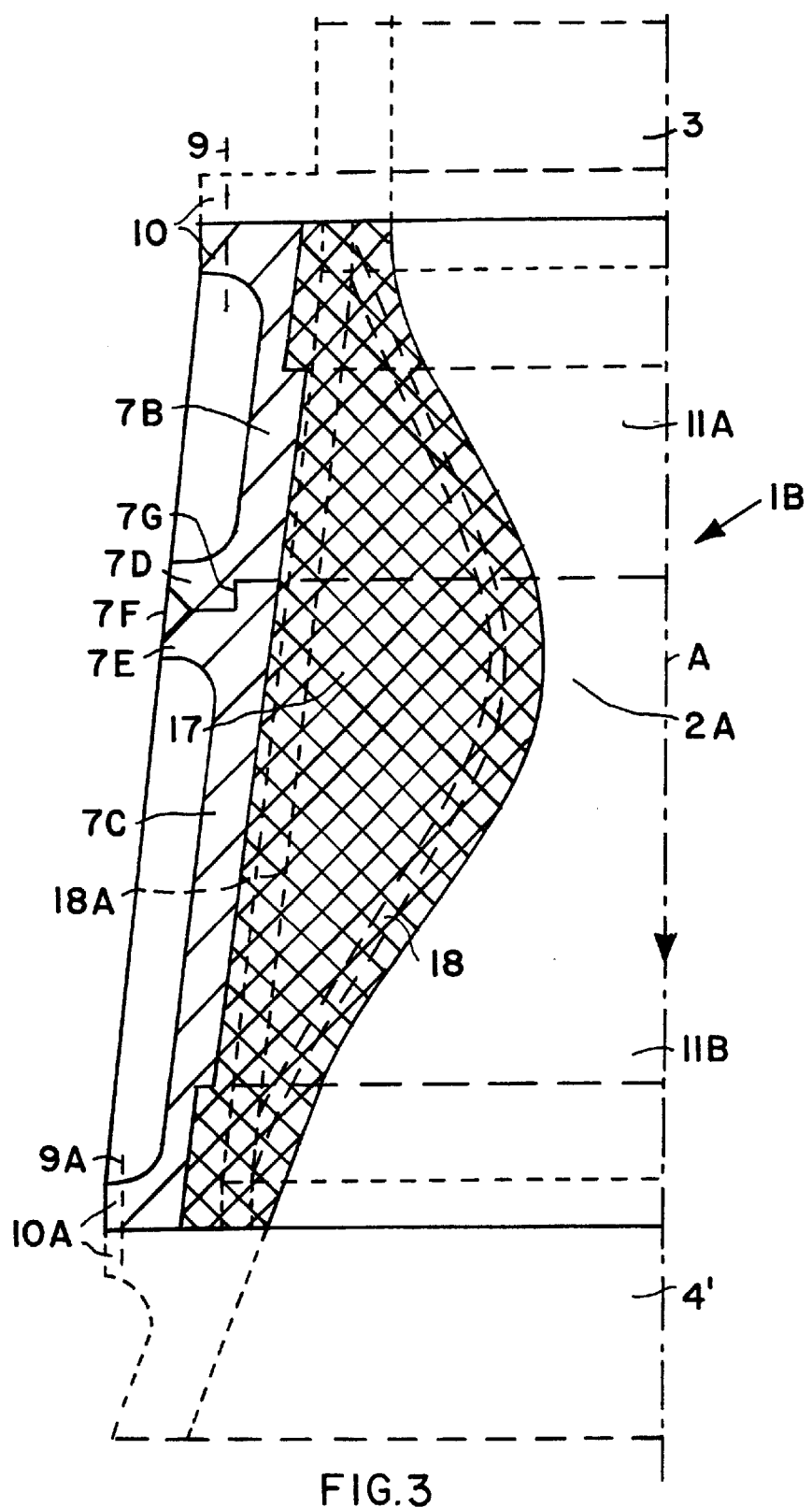
FIG. 3 is a view similar to that of FIG. 2, however illustrating a monolithic rocket engine body that surrounds the combustion chamber, the nozzle and the expansion chamber.

FIG. 3 shows a second embodiment of the invention. A monolithic rocket engine body 1B of carbon fiber reinforced silicon carbide composite material encloses a combustion chamber 11A, a nozzle 2A, and a combustion gas expansion chamber 11B.

The monolithic rocket engine body 1B comprises cooling channels 18 which follow the contour of the radially inwardly facing surface of the body 1B. The cooling channels are connected to the cooling systems of the fuel injection head 3 and of the combustion gas expansion chamber extension 4'. These cooling systems are not shown since they are conventional.

The monolithic rocket engine body 1B has an integral insulation section 17 that may also be provided with cooling channels 18A connected to cooling channels 18 and the above mentioned conventional cooling systems of the head 3 and extension 4'. The porosity of the monolithic body 1B of C/SiC composite material may diminish radially outwardly from the wall toward a metal support structure constructed in FIG. 3 to have at least two support sections 7B and 7C made of metal. These support sections are interconnected, for example, by a welding seam 7F around flanges 7D and 7E centered relative to each other by an overlap 7G preferably extending axially for proper centering of the support sections 7B and 7C relative to each other.

It is a special advantage of the embodiment of FIG. 3 that the support sections 7B, 7C do not have any complicated profiles and that the monolithic rocket engine body 1B does not have any bonding joints. Such a structure is particularly favorable for keeping high pressure and high heat load conditions away from the metallic support sections 7B, 7C.

The embodiment of FIG. 3 has the further advantage that a special contouring of the support sections 7B, 7C is not necessary, because the contouring is provided by the easily machined monolithic rocket engine body 1B along its radially inwardly facing surface. Thus, the support sections 7B, 7C can be produced with far greater tolerances than are conventionally permissible, for example for the inner surface contour of the wall 5 in FIG. 1. Greater tolerances make any required machining operations for the housing sections 7B, 7C simpler. Moreover, easier workable materials can be used for making the support sections 7B, 7C. Another advantage is seen in a considerable weight reduction for the support structures shown in FIG. 2 and in FIG. 3.

Further, it is possible to manufacture the individual C/SiC sections, namely the combustion chamber 11A and the combustion gas expansion chamber 11B of FIG. 2 and the monolithic rocket engine body 1B of FIG. 3 from respective blanks by mechanical machining.

In FIG. 2 the bonding of the two sections by the silicon layer 12 is preferably performed prior to assembly of the body into the support structure 7A. In such a case, the support structure 7A is preferably axially divided to facilitate the assembly. Similarly, in FIG. 3, the support sections 7B and 7C are also axially divided to facilitate the assembly of the monolithic rocket engine body 1B in the support structure.

As mentioned, in both embodiments of FIGS. 2 and 3, additional cooling can be achieved by including cooling channels and/or cooling flow passages as described. Additionally, insulation may be achieved by carbon fiber felts and/or graphite films and/or C/SiC layers or combinations of these materials. Depending on the cooling requirements, cooling can be accomplished by cooling channels in the support structure and/or in the C/SiC bodies or on the surface thereof. A combination of any of the various cooling and insulation possibilities described above can be employed.

The use of insulation layers 13 as shown in FIG. 2 can also be combined with various cooling channels and/or flow passages FP to avoid undesired thermal gradients in the rocket engine body 1A and 1B. In both embodiments the combination of cooling channels or passages with insulation layers provides an especially optimized heat control in the bodies 1A and 1B made of C/SiC composite materials.

The above mentioned high porosity for the insulation made of C/SiC composite material is preferably within the range of 5% to 30% by volume of the insulation body. In that case the density of the insulation body will be within the range of about 1.7 to 2.0 g/cm$^3$. The body of C/SiC composite material forming the combustion chamber, nozzle and expansion chamber has a low porosity of 0% to 5% per volume of the body and a density of 2.5 to 2.7 gram/cm$^3$.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims

What is claimed is:

1. A rocket engine comprising a support structure (7A, 7B, 7C), a rocket engine body (1A, 1B) mounted in said support structure, wherein said rocket engine body is made of carbon fiber reinforced silicon carbide (C/SiC), said rocket engine body comprising a converging combustion chamber (11A) made of C/SiC, a diverging expansion chamber (11B) made of C/SiC, a nozzle (2A) made of C/SiC interconnecting said combustion chamber (11A) with said expansion chamber (11B), and a heat insulation interposed between said support structure and said rocket engine body for protecting said support structure against thermal overloads.

2. The rocket engine of claim 1, wherein said rocket engine body made of carbon fiber reinforced silicon carbide is formed as a lining or cladding on a radially inwardly facing surface of said support structure.

3. The rocket engine of claim 1, wherein at least said rocket engine body comprises a plurality of structural body sections and a siliconized seam (12, SB) bonding neighboring body sections of said structural body sections to each other.

4. The rocket engine of claim 1, wherein said heat insulation comprises heat insulation layer sections, and a siliconized bonding seam between said heat insulation layer sections.

5. The rocket engine of claim 1, wherein said rocket engine body and said heat insulation are together a single piece component having a radially inwardly facing machined surface.

6. The rocket engine of claim 1, further comprising cooling channels machined into said rocket engine body made of carbon fiber reinforced silicon carbide.

7. The rocket engine of claim 6, wherein said cooling channels have a cross-sectional configuration selected from the group of a round cross-section, a rectangular cross-section, and a slotted cross-section.

8. The rocket engine of claim 1, wherein said support structure for said rocket engine body is made of metal.

9. The rocket engine of claim 1, wherein said rocket engine body of carbon fiber reinforced silicon carbide has a first porosity and a first density, and wherein said heat insulation is also made of carbon fiber reinforced silicon carbide and has a second porosity and a second density differing form said first porosity and from said first density, respectively.

10. The rocket engine of claim 9, wherein said second porosity of said heat insulation is higher than said first porosity and said second density of said insulation portion is respectively lower than said first density.

11. The rocket engine of claim 1, wherein said heat insulation is a layer made of a material selected from the group of graphite film, C/SiC, graphite felt, graphite fleece material and carbon fiber felts interposed between said rocket engine body and said support structure.

12. The rocket engine of claim 1, further comprising spacer elements (15) made of carbon fiber reinforced silicon carbide interposed between said rocket engine body and said heat insulation for forming a coolant flow passage (FP) between said rocket engine body and said insulation portion.

13. The rocket engine of claim 1, wherein said heat insulation has a density of 1.7 to 2.0 g/cm$^3$ and a porosity of 5% to 30% by volume of said heat insulation.

14. The rocket engine of claim 13, wherein said heat insulation is C/SiC.

15. A component for a rocket engine, said component comprising a rocket engine body made of carbon fiber reinforced silicon (C/SiC) carbide, said body comprising a converging combustion chamber made of C/SiC, a diverging expansion chamber made of C/SiC and a nozzle made of C/SiC interconnecting said converging combustion chamber and said diverging expansion chamber with each other.

16. The component of claim 15, wherein said rocket engine body comprises a plurality of body sections, siliconized seams (SB) between neighboring body sections said siliconized seams bonding said body sections to each other, and wherein said body sections have radially inwardly facing machined surfaces.

17. The component of claim 15, wherein said body is a monolithic structure comprising machined surfaces forming said converging combustion chamber, said nozzle and said diverging expansion chamber.

18. The component of claim 15, wherein said body of C/SiC has a porosity within the range of 0% to 5% by volume of said body and a density of 2.5 to 2.7 g/cm$^3$.

* * * * *